No. 851,396. PATENTED APR. 23, 1907.
E. A. BODE.
CASTER.
APPLICATION FILED SEPT. 24, 1906.
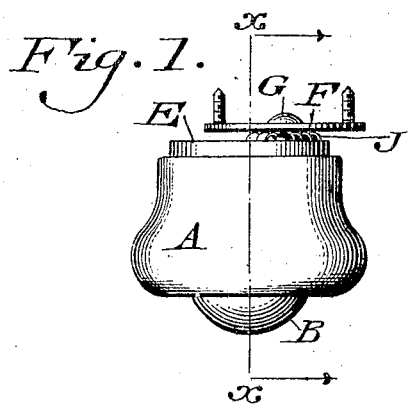
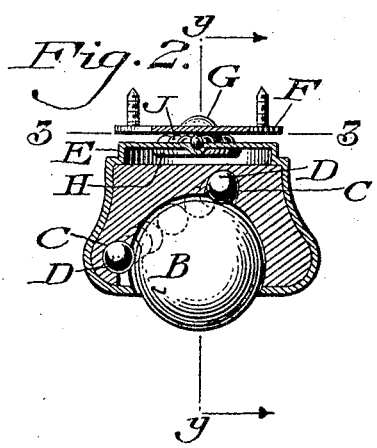
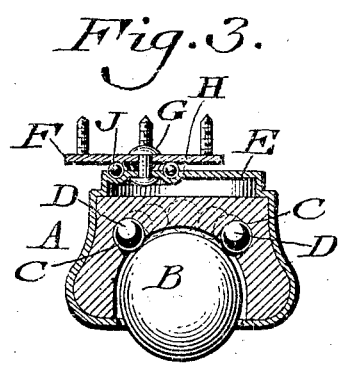
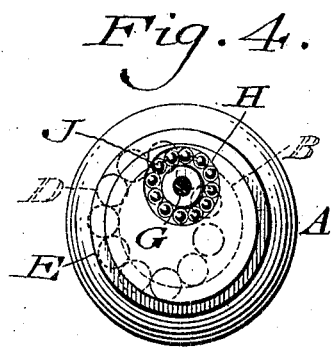
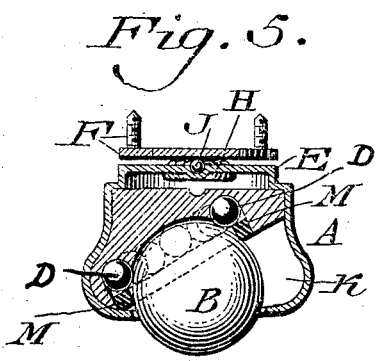
Witnesses
P. F. Nagle
C. D. McVay
Inventor
Emil A. Bode
By Wasserheim + Fairbanks
Attorneys

UNITED STATES PATENT OFFICE.

EMIL A. BODE, OF PHILADELPHIA, PENNSYLVANIA.

CASTER.

No. 851,396.

Specification of Letters Patent.

Patented April 23, 1907.

Application filed September 24, 1906. Serial No. 335,901.

*To all whom it may concern:*

Be it known that I, EMIL A. BODE, a citizen of the United States, residing in the city and county of Philadelphia, State of Pennsylvania, have invented a new and useful Caster, of which the following is a specification.

My invention consists of a caster embodying a ball roller or ball proper whose bearing is on a row of balls extending at an angle to the perpendicular axis of said roller, so that the latter is directed obliquely to said balls and in this manner rolls or revolves on the same, whereby the roller operates with reduced friction, causing a free and easy movement of the caster.

It also consists of details of construction, as will be hereinafter fully described.

Figure 1 represents a side elevation of a caster embodying my invention. Fig. 2 represents a vertical section on line $x$—$x$ Fig. 1. Fig. 3 represents a vertical section on line $y$—$y$ Fig. 2. Fig. 4 represents a horizontal section on line $z$—$z$ Fig. 2. Fig. 5 is a vertical section of a modified form of the invention.

Similar letters of reference indicate corresponding parts in the figures.

Referring to the drawings: A designates the socket or body of a caster, the same containing the ball or ball roller B. On the interior of the socket is the circular runway C which is occupied by the balls D which form a circular row and constitute the bearings of said roller, it being seen that said runway and consequently said balls will be disposed obliquely to and continuous upon both sides of the perpendicular axis of said roller B. By this provision, when the caster is moved, the roller at what may be called one side of the top portion is thrust obliquely against the row of balls, so as to rotate therein and so is removed from frictional contact with any other portion of the interior of the socket A especially directly with the top thereof, and so the roller revolves with freedom and ease on its bearings.

The caster has the top wall E of its socket or casing connected with the attaching plate F by the pivot G, which pivot is mounted in said casing eccentrically to the perpendicular axis of the roller B, whereby the caster may turn on said plate and cause the roller to advance to the balls D at a slant or obliquely to its perpendicular axis and so contact with the same and roll thereon as has been stated. On said top wall is a circular runway H in which is a circular row of balls J mounted concentrically to said pivot G, said balls being in contact with said plate F thus causing an easy and free motion of the caster around the pivot G, said motion being truly circular and concentric with said pivot G, whereby the balls J will not bind in their motion each on itself or with the walls of the casing and runway H.

In Fig. 5, the portion of the body of the socket or casing below the runway is cut away as at K. In order to prevent the balls D from dropping from the runway, owing to said cut away portion, I employ the ring M which is fitted within the casing or socket below said balls and forms a shoulder therefor.

Having thus described my invention, what I claim as new and desire to secure by Letters Patent, is:

1. In a caster, a casing, a ball roller and ball bearings for the latter mounted in said casing, said bearings being oblique to and continuous upon both sides of the perpendicular axis of said ball roller, an attaching plate, and a pivot located in the casing eccentrically to the vertical axis of said ball roller and connecting said attaching plate and said casing.

2. A caster composed of a casing, a ball roller mounted in said casing and ball bearings for the latter, said casing having therein a run-way which is continuous and extends upon both sides of the perpendicular axis of the ball roller and which contains said balls obliquely to the perpendicular axis of said ball roller.

3. A caster composed of a casing, a ball roller mounted in said casing and ball bearings for the latter, said casing having therein a run-way which is continuous and extends upon both sides of the perpendicular axis of the ball roller and which contains said balls obliquely to the perpendicular axis of said ball roller, an attaching plate and a pivot connecting the said plate and casing and disposed in the latter eccentrically to the vertical axis of said roller.

4. A caster composed of a casing, a ball roller mounted in said casing and ball bearings for the latter, said casing having therein a run-way which is continuous and extends upon both sides of the perpendicular axis of the ball roller and which contains said balls obliquely to the perpendicular axis of said ball roller, a pivot in said casing mounted eccentrically to the vertical axis of said ball roller, an attaching plate connected to the casing by said pivot, and ball bearings between said plate and the casing.

5. A caster composed of a casing, a ball roller mounted in said casing and ball bearings for the latter, said casing having therein a run-way which is continuous and extends upon both sides of the perpendicular axis of the ball roller and which contains said balls obliquely to the perpendicular axis of said ball roller, an attaching plate connected to the casing by a pivot, and ball bearings between the same and the casing.

EMIL A. BODE.

Witnesses:
JOHN A. WIEDERSHEIM,
S. R. CARR.